United States Patent [19]

Ledin

[11] 4,194,948

[45] Mar. 25, 1980

[54] LOCKING SUPPORT FOR NUCLEAR FUEL ASSEMBLIES

[75] Inventor: Eric Ledin, San Diego, Calif.

[73] Assignee: General Atomic, San Diego, Calif.

[21] Appl. No.: 851,470

[22] Filed: Nov. 14, 1977

[51] Int. Cl.² ............................................. G21C 13/04
[52] U.S. Cl. ....................................... 176/87; 176/40; 176/81
[58] Field of Search ..................... 176/40, 50, 61, 68, 176/81, 87

[56] References Cited

U.S. PATENT DOCUMENTS

| | | | |
|---|---|---|---|
| 3,202,583 | 8/1965 | Salesse et al. ...................... | 176/81 X |
| 3,266,997 | 8/1966 | Hooper et al. .................... | 176/81 X |
| 3,386,885 | 6/1968 | Wright ............................... | 176/40 X |
| 3,475,272 | 10/1969 | Fortescue et al. ................. | 176/81 X |
| 3,666,624 | 5/1972 | Finch et al. ....................... | 176/50 X |
| 4,053,359 | 10/1977 | Pennell et al. ..................... | 176/40 X |
| 4,057,468 | 11/1977 | Lunt ................................... | 176/40 X |

Primary Examiner—Peter A. Nelson
Attorney, Agent, or Firm—Fitch, Even & Tabin

[57] ABSTRACT

A locking device for supporting and locking a nuclear fuel assembly within a cylindrical bore formed by a support plate, the locking device including a support and locking sleeve having upwardly extending fingers forming wedge shaped contact portions arranged for interaction between an annular tapered surface on the fuel assembly and the support plate bore as well as downwardly extending fingers having wedge shaped contact portions arranged for interaction between an annularly tapered surface on the support plate bore and the fuel assembly whereby the sleeve tends to support and lock the fuel assembly in place within the bore by its own weight while facilitating removal and/or replacement of the fuel assembly.

9 Claims, 2 Drawing Figures

LOCKING SUPPORT FOR NUCLEAR FUEL ASSEMBLIES

BACKGROUND OF THE INVENTION

The present invention relates generally to nuclear reactor systems and, more particularly, to a locking device for supporting and locking fuel assemblies in place upon a support plate in a gas cooled reactor.

In gas cooled reactors, a reactor core is formed with a number of fuel assemblies containing fissile and/or fertile materials serving as a source of heat. A coolant gas such as helium, for example, is circulated between the reactor core and heat exchanger means in order to remove heat from the reactor core and employ it for doing useful work.

Within such reactors, the fuel assemblies are commonly formed as elongated tubular members which are suspended from a support plate or grid in order to facilitate circulation of the coolant gas through the fuel assemblies.

In gas cooled reactors of the type referred to above, the fuel assemblies are commonly installed and removed from beneath the grid or support plate so that the fuel assemblies must be firmly anchored to or secured upon the plate. In addition, it is necessary to assure against the fuel assemblies dropping from the support plate under normal operating conditions as well as under abnormal conditions caused for example by a seismic occurrence.

Normal forces acting upon fuel assemblies supported in such a gas cooled reactor include:

(a) downward force tending to separate the fuel assembly from the support plate resulting from the weight of the fuel assembly itself, (b) additional downward separating force resulting from a pressure drop caused by downward flow of coolant gases through the fuel assembly, and (c) possible vibratory effects of the coolant gas flow acting upon the fuel assembly.

Abnormal forces acting upon the heat fuel assembly which must also be resisted in order to firmly secure the fuel assembly in place upon the support plate include:

(a) Lateral forces resulting from relative horizontal acceleration between the respective fuel assemblies and the support plate such as may be caused for example by seismic effects, and (b) Upward and/or downward forces caused for example by vertical acceleration which may also result for example from a seismic occurrence.

Accordingly, there has been found to remain a need for a suitable locking device capable of supporting and locking such fuel assemblies in place within bores formed in a support plate while resisting forces of the type referred to above.

SUMMARY OF THE INVENTION

It is accordingly an object of the invention to provide a locking device for supporting and locking fuel assemblies in place in bores of a support plate, the device being capable of overcoming problems of the type referred to above while facilitating removal and/or replacement of the fuel assemblies upon the support plate.

The locking device preferably includes a sleeve arranged between the fuel assembly and a receiving bore of the support plate, the sleeve including upwardly extending fingers arranged in wedged engagement between an annularly tapered surface on the fuel assembly and the bore of the support plate, the sleeve also having downwardly extending fingers arranged in wedged engagement between a tapered surface of the bore and the surface of the fuel assembly, the sleeve interacting with the fuel assembly and support plate bore so that the fuel assembly is supported therein by its own weight.

Preferably, the downwardly extending fingers are pre-stressed in a radial direction to facilitate removal and/or insertion of the fuel assembly within the bore. Additional means are also preferably provided to resist undesired upward movement of the fuel assembly within the bore, for example, upon the occurrence of a seismic event in order to prevent undesired disengagement of the sleeve from between the fuel assembly and the support plate bore. Seal means may also be employed in conjunction with the sleeve to restrict and adjust the flow of coolant gases past and through the fuel assembly.

Additional objects and advantages of the invention are made apparent in the following description having reference to the accompanying drawings.

DESCRIPTION OF THE PREFERRED EMBODIMENTS

Figure 1:
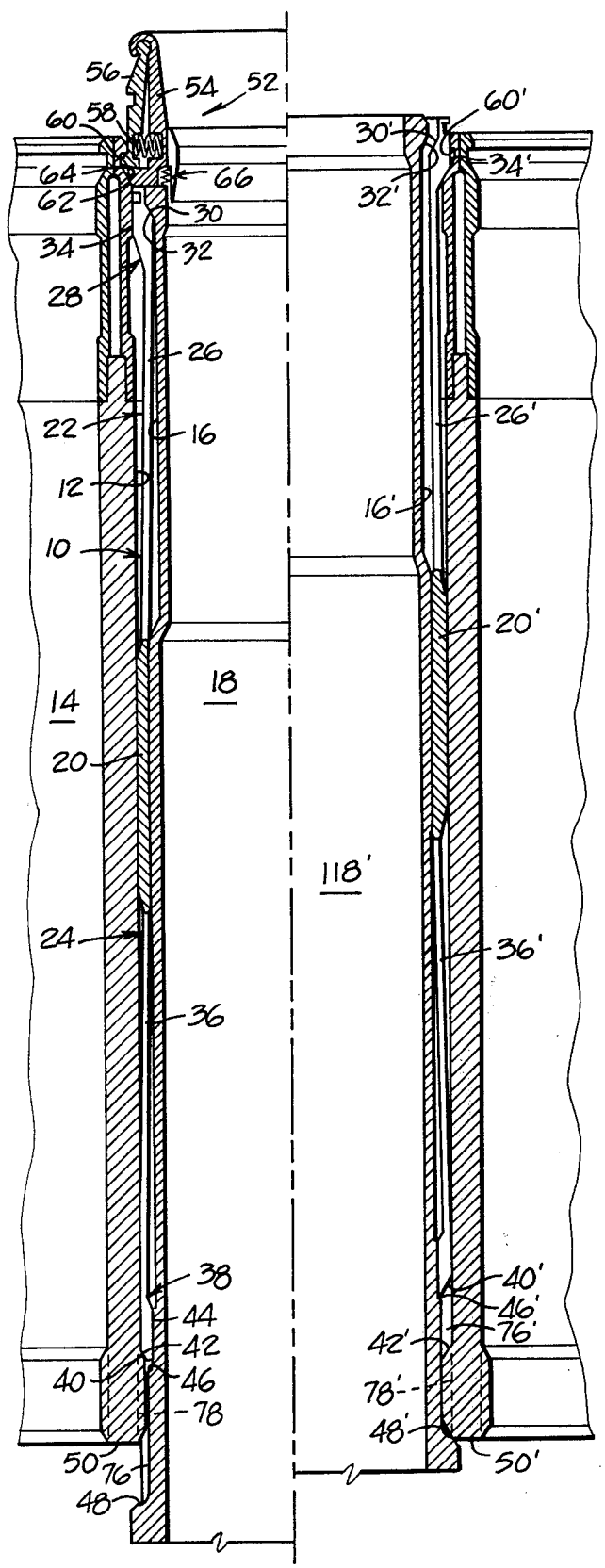
FIG. 1 is an axially sectioned view of a fuel assembly secured in place in a bore of a support plate by a locking assembly according to the present invention, one lateral portion of the drawing illustrating the fuel assembly in a fully supported and locked position within the support plate bore, the other lateral portion of the drawing illustrating the fuel assembly in a selectively raised position to permit disengagement of the locking assembly for removing or replacing the fuel assembly.

Referring to the drawings, each of the figures illustrates a locking device according to the present invention for supporting and locking a fuel assembly in place upon a support plate or grid structure with the weight of the fuel assembly and other forces acting downwardly upon the fuel assembly serving to retain it in place. In addition, the locking device may be released in order to facilitate the removal or replacement of each fuel assembly. Since retention forces are developed within the locking device due to the weight of the fuel assembly, the retention forces increase in proportion with the weight of the fuel assembly and other forces acting downwardly thereupon. Accordingly, no pre-load forces need be applied to the locking mechanism to counteract the natural and operational separating forces between the fuel assembly and the supporting grid plate.

Generally, each of the figures illustrates a fuel assembly and fragmentary portion of a supporting grid in a reactor core in a nuclear reactor, preferably a gas cooled rector, which is not otherwise illustrated. In any event, it will be apparent from the following description that the grid or support plate comprises a number of openings for supporting a plurality of similar fuel assemblies to permit passage of coolant gas therepast.

Referring now to FIG. 1, the locking device of the present invention primarily comprises a sleeve generally indicated at 10 which is positioned in an annular space formed between a bore 12 in the grid or support plate 14 and the tubular surface 16 of a fuel assembly 18.

The manner in which the locking device serves to support the fuel assembly within the bore 12 of the support plate in response to the weight of the fuel assembly is described below. For purposes of the present invention, it is sufficient to understand that the fuel assembly is of generally conventional construction and is formed with inlet and outlet passages (not shown) for permitting coolant gas to flow through the fuel assembly as it passes along the bore 12 of the support plate.

The support and locking sleeve 10 includes a solid tubular portion generally indicated at 20 which is arranged within a central portion of the bore 12. The sleeve also includes upper and lower portions indicated respectively at 22 and 24.

The upper sleeve portion 22 comprises a plurality of axially extending members or fingers 26 which are circumferentially arranged between the bore 12 and fuel assembly surface 16. The upper end of each of the fingers 26 is formed with a wedge shaped structure 28 which forms an annular contact surface 30 facing radially inwardly and upwardly for engagement with an annular tapered surface 32 formed at the upper end of the fuel assembly. The wedged shaped structure 28 also forms a contact surface 34 opposite the surface 32 to engage the bore 12 of the support plate in a manner described in greater detail below.

The lower sleeve portion 24 similarly comprises a plurality of downwardly extending elements or fingers 36 which are also circumferentially arranged between the support plate bore 12 and the surface 16 of the fuel assembly. Each of the lower fingers 36 forms a wedge shaped structure 38 at its lower end. Each wedge shaped structure 38 forms an annular contact surface 40 facing radially outwardly and downwardly for engagement with an annular tapered surface 42 at the lower end of the bore 12 in the support plate. The wedge shaped structure 38 also forms a contact surface 44 opposite the surface 42 for engagement with a surface portion of the fuel assembly in a manner described in greater detail below.

The locking and support sleeve 10 functions together with the tapered surfaces 32 and 42 on the fuel assembly and support plate bore respectively to support the fuel assembly within the bore. In operation, as may best be seen on the left side of FIG. 1, the weight of the fuel assembly 18 is transmitted to the sleeve 10 through interaction of the tapered surfaces 30 and 32 and the upper fingers 26. The slope of the surfaces 30 and 32 forces the wedge shaped portions of the fingers outwardly so that the surfaces 34 are urged into engagement with the bore 12 of the support plate to develop a taper socket configuration producing relatively tight radial engagement at the upper end of the fuel assembly.

Downward thrust of the sleeve developed by the weight of the fuel assembly in the manner described above is transmitted through the lower fingers 36 and the engaged, tapered surfaces 40 and 42 to the lower portion of the grid plate. Here again, the tapered slope of the surfaces 40 and 42 forces the wedge shaped portions 38 of the lower fingers inwardly so that the opposite contact surfaces 44 are urged into engagement with the surface 16 of the fuel assembly.

Proper operation of the locking sleeve 10 is dependent upon the angular configuration of the surfaces 30, 32 and 40, 42 to produce an optimum coefficient of friction between those engaging surfaces and also between the opposed surfaces 34 and 44 with the bore 12 and fuel assembly surface respectively. The angle of the tapered surfaces 30 and 32 relative to the diameter of the bore 12 is selected so that frictional engagement is developed between the surfaces 34 and the bore 12 while the weight of the fuel assembly is substantially transmitted through the sleeve 10 to the tapered surfaces 40 at the lower end of the bore 12.

The angle of the tapered surfaces 40 and 42 relative to the axis of the bore 12 is selected to produce radial interaction between the surfaces 44 and the fuel assembly surface while developing a wedging force so that the weight of the fuel assembly is transferred through the annular surface 42 into the support plate. As may be seen in FIG. 1, the tapered surfaces 30, 32 and 40, 42 are generally parallel and each form an angle of approximately 30° relative to the axis of the bore 12.

The sleeve 10 is further designed to facilitate installation and/or removal and replacement when necessary of each fuel assembly 18. In the righthand portion of FIG. 1, similar components are indicated by primed numerals. In that portion of the figure, the fuel assembly 18' and sleeve 10' are illustrated in a raised position suitable for either insertion or removal of the fuel assembly from the bore 12'.

The fuel assembly 18' is adapted to raise the sleeve 10' through interaction of a lug 46' with each of the lower fingers 36'. As may be seen in the right hand portion of FIG. 1, the lug 46' engages the lower end of a finger 36' in order to raise the sleeve 10' to the position shown.

Each of the lower fingers 36 is formed with a prestressed condition tending to urge the fingers radially outwardly. Thus, when there is no interaction between the tapered surfaces 40 and 42, the lower fingers tend to move outwardly against the bore 12 in order to facilitate removal or installation of the fuel assembly through the bottom of the support plate in a manner described in greater detail below.

The upper fingers 26 are also pre-stressed and tend to move radially inwardly into engagement with the fuel assembly 18. In order to remove or install a fuel assembly, a special tool (not shown) may be used to spread all of the upper fingers 26 outwardly for example into the position illustrated for the one finger 26' at the right of FIG. 1. With the upper fingers in that position, the fuel assembly 18' may be lowered out of engagement with the bore 12' and sleeve 10'. However, with the upper fingers normally acting inwardly against the fuel assembly, its downward movement results in return of the support and locking sleeve to the configuration illustrated on the left side of FIG. 1. Accordingly, either removal or installation of the fuel assembly is possible when the upper fingers of the locking sleeve are retained in the position illustrated by the one finger 26' at the right of FIG. 1.

Upward movement of the fuel assembly 18 is limited by engagement of a shoulder 48 with the bottom surface 50 of the support plate. For example, on the right side of FIG. 1, the shoulder is illustrated at 48' in abutting engagement with the bottom surface 50'.

In order to even more closely limit undesirable upward movement of the fuel assembly, a mechanical restraint and flow restricting seal assembly 52 is arranged at the upper end of the bore 12. The assembly 52 includes an annular support structure 54 and a plurality of hinged restraint levers 56 which are urged outwardly by springs 58 for engagement with an annular recess 60 at the upper end of the support plate bore 12. Thus, the fuel assembly is normally locked in place within the bore by interaction of the levers 56 with the recess 60.

In order to remove or install a fuel assembly however, the levers 56 may be urged inwardly to permit upward movement of the fuel assembly and locking sleeve toward the position illustrated at the right of FIG. 1. The assembly 52 also forms a sealing surface 62 which engages a similarly tapered sealing surface 64 at the upper end of the support plate bore 12 to prevent passage of coolant gas. An additional annular seal assembly 66 resiliently engages the upper end of the fuel assembly and functions to limit the passage of coolant gases between the fuel assembly and the bore 12. The seal assembly 66 internal bore size is adjustable for example in order to reduce coolant inlet flow to the fuel assembly to compensate for diminishing thermal output due to normal fuel consumption.

The lower end of the fuel assembly is formed with a plurality of keys, one of which is indicated at 76. The keys 76 align with the key ways 78 formed by the support plate bore below the tapered surface 42 to receive the keys 76 and assure proper angular alignment of the fuel assembly within the bore 12.

Figure 2:
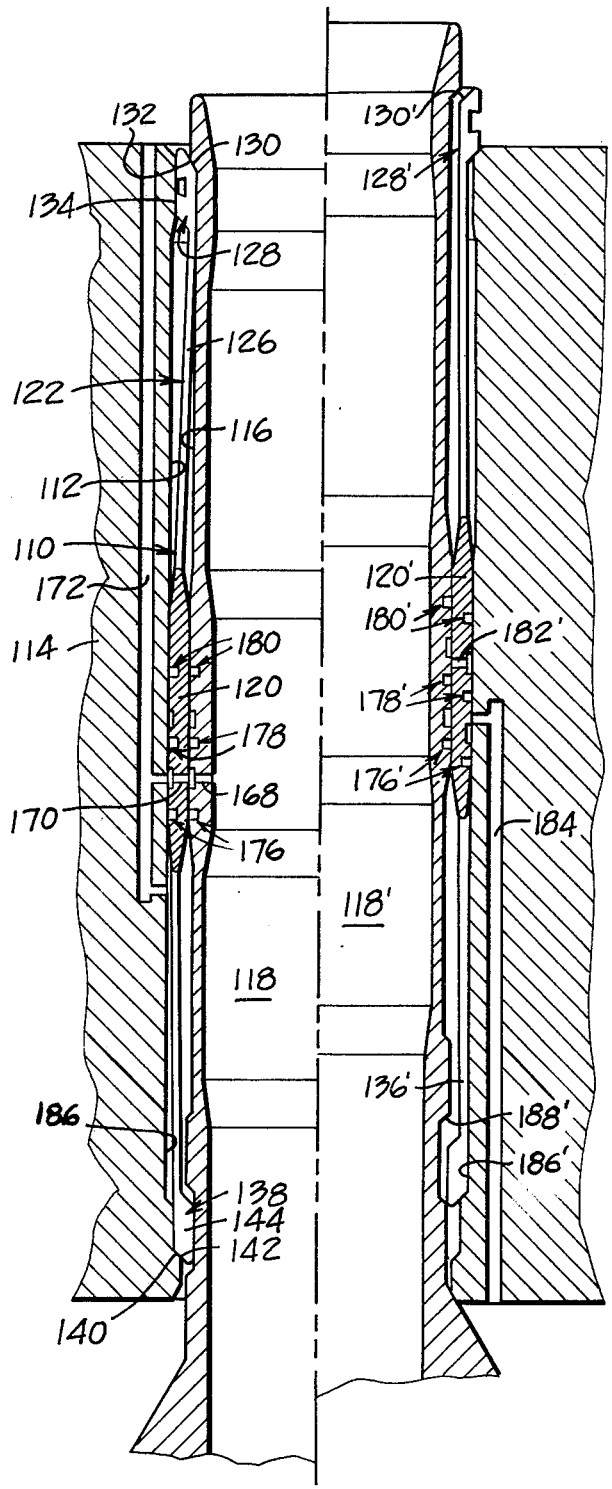
FIG. 2 is a similar view of another embodiment of a locking assembly constructed according to the present invention.

FIG. 2 illustrates an additional embodiment of the support and locking mechanism of the present invention. The assembly of FIG. 2 includes generally the same components as described above in connection with FIG. 1. Accordingly, similar numerals preceded by the additional digit "1" are employed to indicate corresponding components in FIG. 2. FIG. 2 does not include a mechanical restraint and flow restricting seal assembly as indicated at 52 in FIG. 1. However, similar restraint means could be employed with the FIG. 2 embodiment if desired.

The embodiment of FIG. 2 particularly contemplates the use of the fuel assemblies of a conventional type including a venting arrangement for alleviating excessive pressure build-up within the fuel assembly. Such a venting arrangement is described for example in U.S. Pat. No. 3,743,576 issued July 3, 1973 and assigned to the assignee of the present invention.

The fuel assembly 118 of FIG. 2 includes a vent outlet at 168. The central portion 120 of the sleeve and an adjacent portion of the support plate structure form passages 170 and 172 in communication with the vent outlet 168 for receiving gaseous fission products vented from the fuel assembly. Thus, the gaseous fission products may be safely removed from the fuel assembly without contaminating the coolant gas.

In order to prevent contamination, three sets of seal rings 176, 178 and 180 are arranged for interaction between the central sleeve portion 120 and the bore 112 and between the central sleeve portion and the fuel assembly. The seal rings 176 and 178 are respectively arranged below and above both the vent outlet 168 and passage 170. An additional passage 182', illustrated on the right side of FIG. 2, is formed by the sleeve between the seals 178 and 180 for communication with another passage 184 in the support plate structure, at least when the fuel assembly is in an operative position as illustrated at the left of FIG. 2.

Within the arrangement of fuel rings and venting passages described, the uppermost seal 180 acts as a primary flow bypass seal. The region between the uppermost seal 180 and the adjacent seal 178 is vented to the low pressure region beneath the support plate, at least when the fuel assembly is seated as illustrated on the left of FIG. 2, to prevent the higher inlet pressure from entering the fission traps and fuel rods (within the fuel assembly) which are at the lower pressure of the outlet region beneath the support plate. At the same time the passage 172 functions to receive gaseous fission products from the fuel assembly in the manner described above.

In addition, an annular recess 186 is formed at the lower end of the bore 112 to receive the pre-stressed lower fingers 136 as the fuel assembly and locking sleeve are shifted upwardly. Here again, the rightward portion of FIG. 2 illustrates the fuel assembly and sleeve shifted upwardly into position indicated by primed numerals. In that position, one of the lower fingers 136' is illustrated within the recess 186'.

Otherwise, it is believed apparent that the locking assembly illustrated in FIG. 2 operates in generally the same manner described above for the embodiment of FIG. 1.

Lugs 188 are arranged on the fuel assembly for normally interacting with the lower fingers to prevent undesirable dropping of the fuel assembly. However, when the lower fingers are retained in the recesses 186', the lugs 188' do not engage the fingers and the fuel assembly may be inserted into or removed from the support plate bore.

Accordingly, it may be seen that the two embodiments of the invention as described above provide support and locking means for retaining individual fuel assemblies within bores of a grid or support plate. Various modifications of the invention in addition to those illustrated and described above will be apparent to those skilled in the art from the preceding description and accompanying drawings. The scope of the present invention is therefore defined only by the following appended claims.

What is claimed is:

1. A locking device for supporting and locking a nuclear fuel assembly in place upon a fuel core support plate, the fuel assembly having an elongated, generally tubular configuration and the support plate having a vertically arranged bore for receiving the fuel assembly, comprising a suppport and locking sleeve having a continuous tubular portion disposed between the fuel assembly and the support plate bore, an upper portion of said sleeve having a plurality of upwardly extending fingers each forming at its upper end a contact surface facing radially inwardly and upwardly and a radially outwardly facing surface, a lower portion of said sleeve having a plurality of axially extending fingers each forming at its lower end a contact surface facing radially outwardly and downwardly and an opposed radially inwardly facing surface, means on the fuel assembly forming an annularly tapered surface arranged for engagement with said contact surfaces on said upwardly fingers, and means on the support plate bore forming an annularly tapered surface arranged for engagement with said contact surfaces on said downwardly extending fingers, said upper and lower fingers being sized so that their opposed surfaces bear on the support plate bore and the fuel assembly surface respectively while their contact surfaces are in engagement with the tapered surfaces on the fuel assembly and support plate bore respectively.

2. A locking device according to claim 1 further comprising means for restricting undesired upward movement of the fuel assembly.

3. A locking device according to claim 2 wherein said restricting means may be disengaged to permit initial upward movement of the fuel assembly for facilitating installation and removal of the fuel assembly from the bottom of the support plate.

4. A locking device according to claim 1 wherein the fuel assembly is of a type adapted for use in a gas cooled nuclear reactor and comprising means for restricting the bypass flow of coolant gas through the support plate bore around the fuel assembly.

5. A locking device according to claim 1 wherein a flow regulating means is adjustable to vary the amount of coolant gas flow permitted through the fuel assembly.

6. A locking device according to claim 1 wherein said lower fingers are pre-stressed so that they tend to move radially outwardly against the support plate bore in order to facilitate installation and removal of the fuel assembly from the bottom of the support plate.

7. A locking device according to claim 6 wherein the upper fingers are pre-stressed so that they tend to act radially inwardly against the fuel assembly in order to prevent accidental dropping of the fuel assembly from the support plate, the fuel assembly and said sleeve being movable upwardly relative to the support plate bore so that said upper fingers may be retracted outwardly in order to permit installation and removal of the fuel assembly.

8. A locking device according to claim 1 wherein said continuous tubular portion of said sleeve forms a passage for communicating vented gases from an outlet of the fuel assembly and further comprising seal rings arranged above and below said passage for limiting the flow of said vented gases.

9. A locking device according to claim 1 and further comprising a combination of key means and key way means formed at the lower ends of the support plate bore and fuel assembly to control angular alignment of the fuel assembly within the support plate bore.

* * * * *

UNITED STATES PATENT AND TRADEMARK OFFICE
CERTIFICATE OF CORRECTION

PATENT NO. : 4,194,948
DATED : March 25, 1980
INVENTOR(S) : Eric Ledin

It is certified that error appears in the above-identified patent and that said Letters Patent are hereby corrected as shown below:

In column 3, line 23, "wedged" should be --wedge--.

In column 6, line 55, insert --extending-- after "upwardly".

In column 8, line 7, insert --radially-- after "retracted".

Signed and Sealed this

Nineteenth Day of August 1980

[SEAL]

Attest:

Attesting Officer

SIDNEY A. DIAMOND

Commissioner of Patents and Trademarks

UNITED STATES PATENT OFFICE
CERTIFICATE OF CORRECTION

Patent No. 4,194,948          Dated  March 25, 1980

Inventor(s)  Eric Ledin

It is certified that error appears in the above-identified patent and that said Letters Patent are hereby corrected as shown below:

Assignee: The United States of America as represented by the United States Department of Energy, Washington, D. C.

Col. 1, between lines 5 and 6, insert the following paragraph:

-- The Government has rights in the invention pursuant to Contract No. EY-76-C-0167, Project Agreement No. 23, awarded by the United States Department of Energy. --

Signed and Sealed this

Sixth Day of October 1981

[SEAL]

Attest:

GERALD J. MOSSINGHOFF

Attesting Officer    Commissioner of Patents and Trademarks